US012749849B2

(12) United States Patent
Ou Yang et al.

(10) Patent No.: US 12,749,849 B2
(45) Date of Patent: Sep. 29, 2026

(54) QUICK-LOCK CONNECTOR

(71) Applicants: KUNSHAN AMPHENOL ZHENGRI ELECTRONICS CO., LTD., Kunshan City (CN); AMPHENOL LTW TECHNOLOGY CO., LTD., New Taipei City (TW)

(72) Inventors: Shu-Hua Ou Yang, New Taipei City (TW); Chu-Hsueh Lee, New Taipei City (TW)

(73) Assignees: KUNSHAN AMPHENOL ZHENGRI ELECTRONICS CO., LTD., Kunshan City (CN); AMPHENOL LTW TECHNOLOGY CO., LTD., New Taipei City (TW)

( * ) Notice: Subject to any disclaimer, the term of this patent is extended or adjusted under 35 U.S.C. 154(b) by 328 days.

(21) Appl. No.: 18/587,271

(22) Filed: Feb. 26, 2024

(65) Prior Publication Data

US 2025/0167487 A1 May 22, 2025

(30) Foreign Application Priority Data

Nov. 16, 2023 (CN) ........................ 202311527510.X

(51) Int. Cl.
*H01R 13/625* (2006.01)

(52) U.S. Cl.
CPC .................................. *H01R 13/625* (2013.01)

(58) Field of Classification Search
CPC .................................................... H01R 13/625
USPC ........................................ 439/372, 314, 318
See application file for complete search history.

(56) References Cited

U.S. PATENT DOCUMENTS

| | | | | |
|---|---|---|---|---|
| 6,203,349 B1 | 3/2001 | Nakazawa | | |
| 8,939,783 B2 * | 1/2015 | Pfeiffer | H01R 13/6273 439/923 | |
| 11,322,884 B2 * | 5/2022 | Krome | H01R 13/6271 | |
| 11,424,574 B1 | 8/2022 | Huang et al. | | |
| 2013/0122735 A1 * | 5/2013 | Pfeiffer | H01R 13/6273 439/372 | |
| 2015/0222050 A1 * | 8/2015 | Behning | H01R 13/6456 439/314 | |

FOREIGN PATENT DOCUMENTS

| | | |
|---|---|---|
| JP | 2003208945 A | 7/2003 |
| TW | M655922 U | 5/2024 |

OTHER PUBLICATIONS

Office Action dated Oct. 28, 2024 of the corresponding Taiwan patent application No. 113101116.
Search Report dated Jul. 31, 2024 of the corresponding European patent application No. 24160780.3.

* cited by examiner

*Primary Examiner* — Gary F Paumen
(74) *Attorney, Agent, or Firm* — HDLS IPR SERVICES; Chun-Ming Shih

(57) ABSTRACT

A quick-lock connector (10) used for a counterpart connector (100) includes a connector body (1), a rotary sleeve (2) and a clockwork spring (3). The rotary sleeve (2) is rotatably disposed around the connector body (1) and includes a latching structure (21) capable of latching the counterpart connector (100). The clockwork spring (3) is nested passes between the connector body (1) and the rotary sleeve (2) for elastically supporting. Thereby, the quick-lock connector (10) has advantages of easy assembling and labor saving.

7 Claims, 11 Drawing Sheets

QUICK-LOCK CONNECTOR

BACKGROUND

Technical Field

The disclosure relates to a connector structure, particularly to a quick-lock connector.

Related Art

A connection of male and female heads of a related-art quick-lock connector has a convex structure and a concave structure disposed on rotary sleeves which are engaged with each other and has a spiral spring is used for returning the rotary sleeve, so that the rotary sleeve is pulled by the spiral spring and locked at a position where the convex structure is engaged with the concave structure.

However, the spiral spring of the above-mentioned quick-lock connector is arranged and installed along the circumferential direction of the rotary sleeve, so the spiral spring must be bent to form an arc shape in advance, and a guide mechanism should be additionally used for assembling the spiral spring on the rotary sleeve. However, it can easily detach from the rotary sleeve if a slightly improper force is applied to the spiral spring, this leads to the inconvenience of assembling to operators and a waste of labor.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

The disclosure provides a quick-lock connector, which has a clockwork spring nested between the connector body and the rotary sleeve for elastically supporting so that it is easy for assembling and labor saving.

In an embodiment of the disclosure, the disclosure provides a quick-lock connector used for a counterpart connector, the quick-lock connector includes a connector body, a rotary sleeve and a clockwork spring. The rotary sleeve is rotatably disposed around the connector body and includes a latching structure which can be engaged with the counterpart connector. The clockwork spring nested between the connector body and the rotary sleeve for elastically supporting.

Accordingly, the clockwork spring is an elastic spiral strip and therefore suitable for being installed in an annular space, so that the clockwork spring may be directly nested between the connector body and the rotary sleeve without being bent and deformed and an additional guiding mechanism. Thus, when assembling the quick-lock connector, the clockwork spring will not separate from the rotary sleeve due to an elastic return force caused by an improper force exerted on the clockwork spring, so that the assembling of the quick-lock connector is easy and labor saving.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
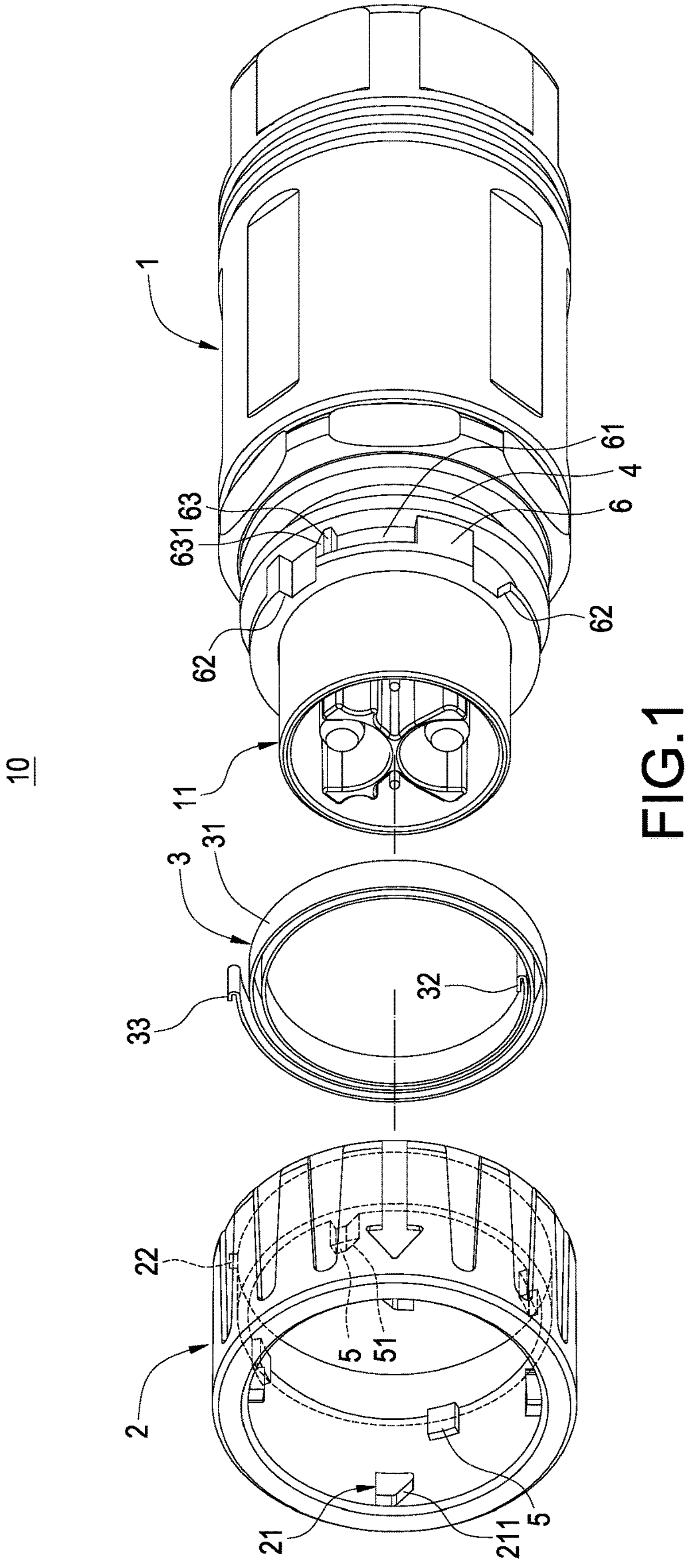
FIG. 1 is an explode view of the quick-lock connector of the disclosure.
Figure 2:
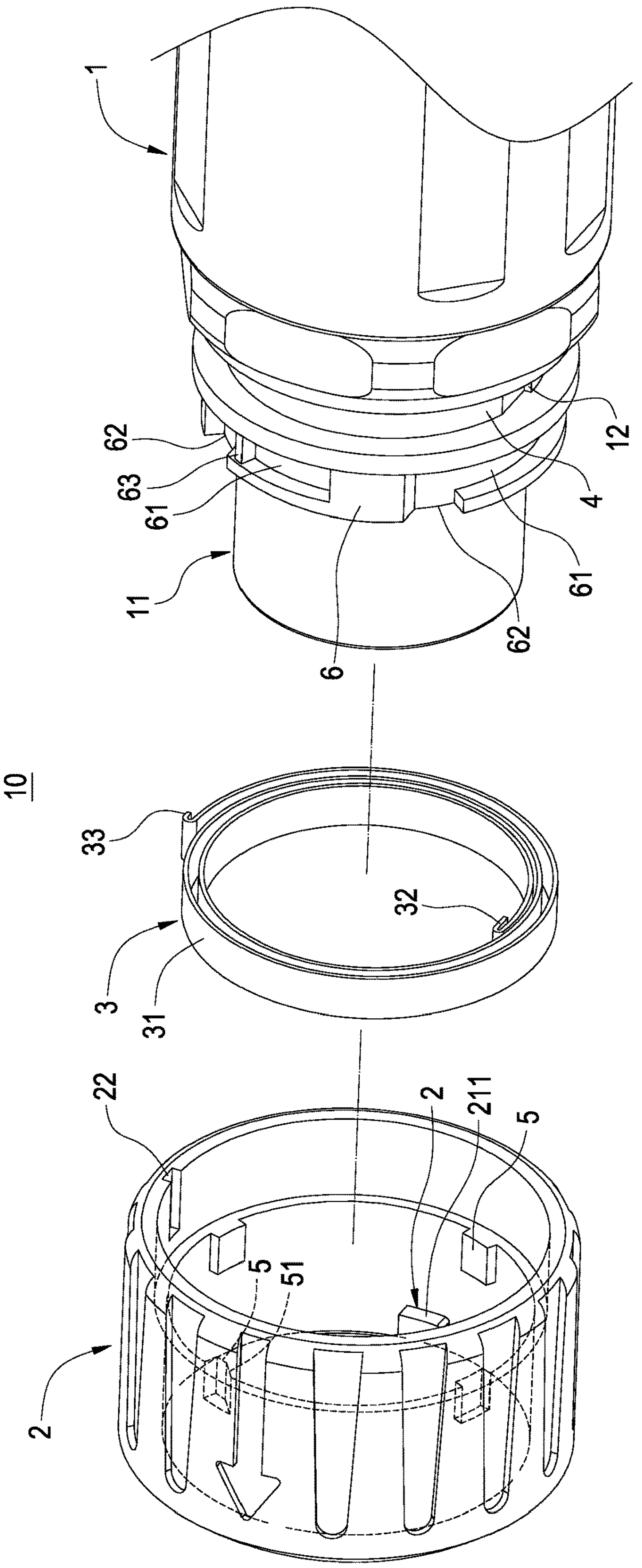
FIG. 2 is another explode view of the quick-lock connector of the disclosure.
Figure 4:
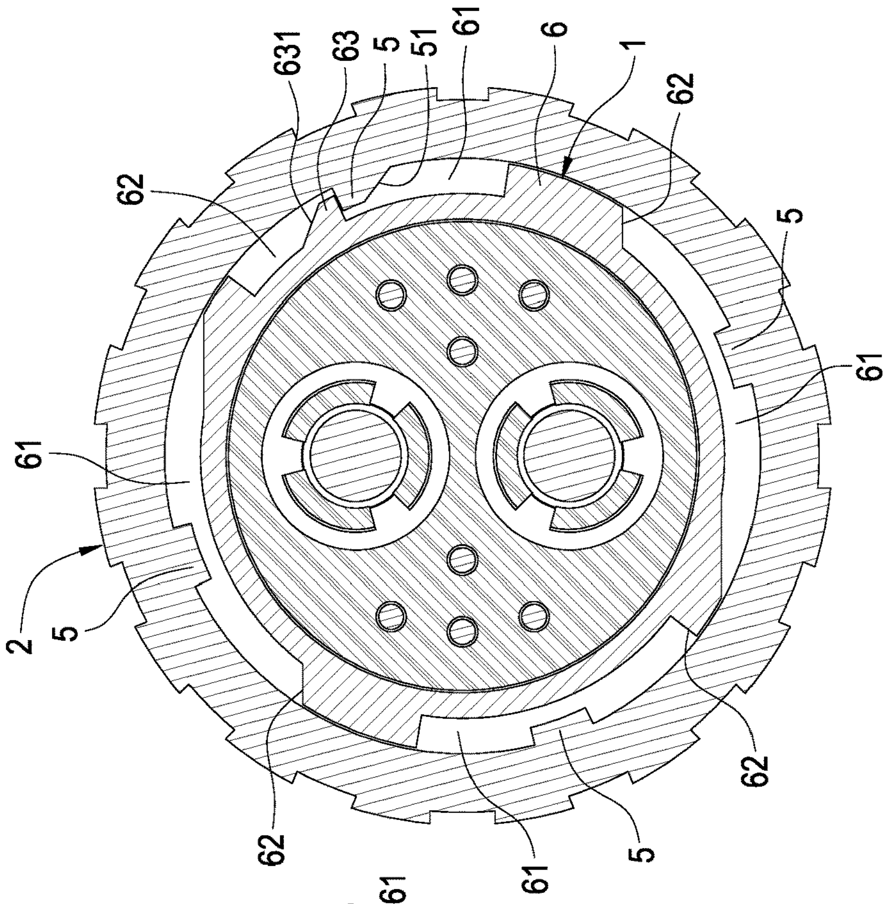
FIG. 4 is another cross-sectional schematic view of the quick-lock connector of the disclosure.
Figure 3:
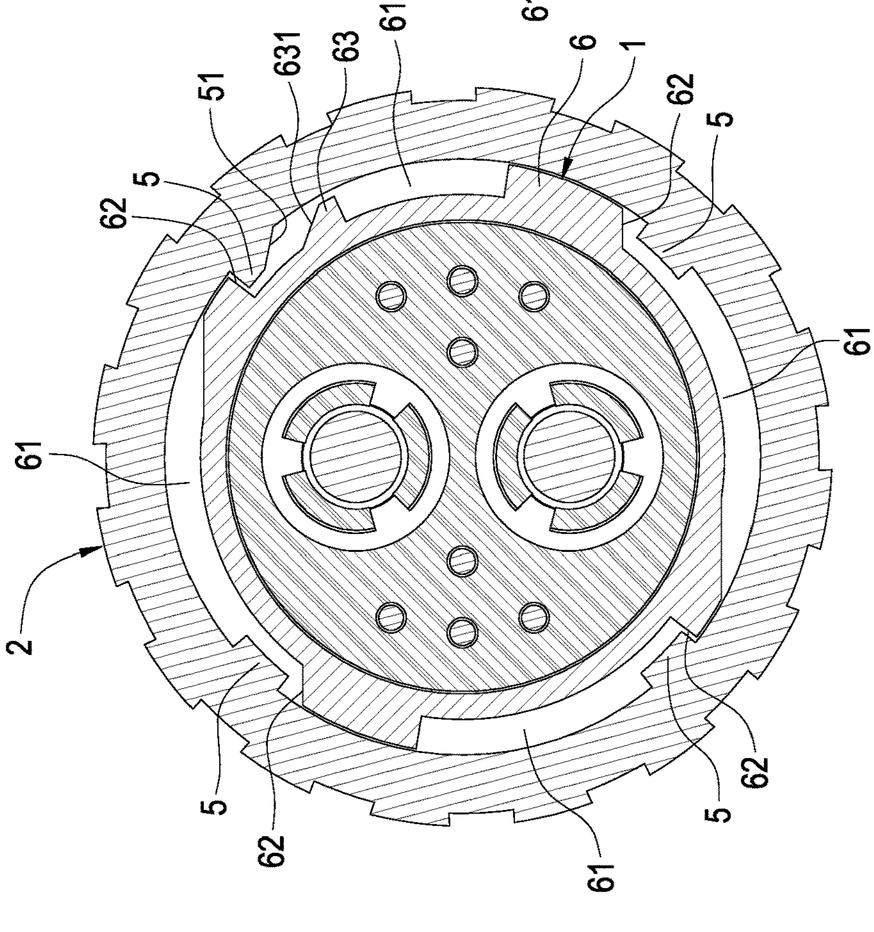
FIG. 3 is a cross-sectional schematic view of the quick-lock connector of the disclosure.
Figure 5:
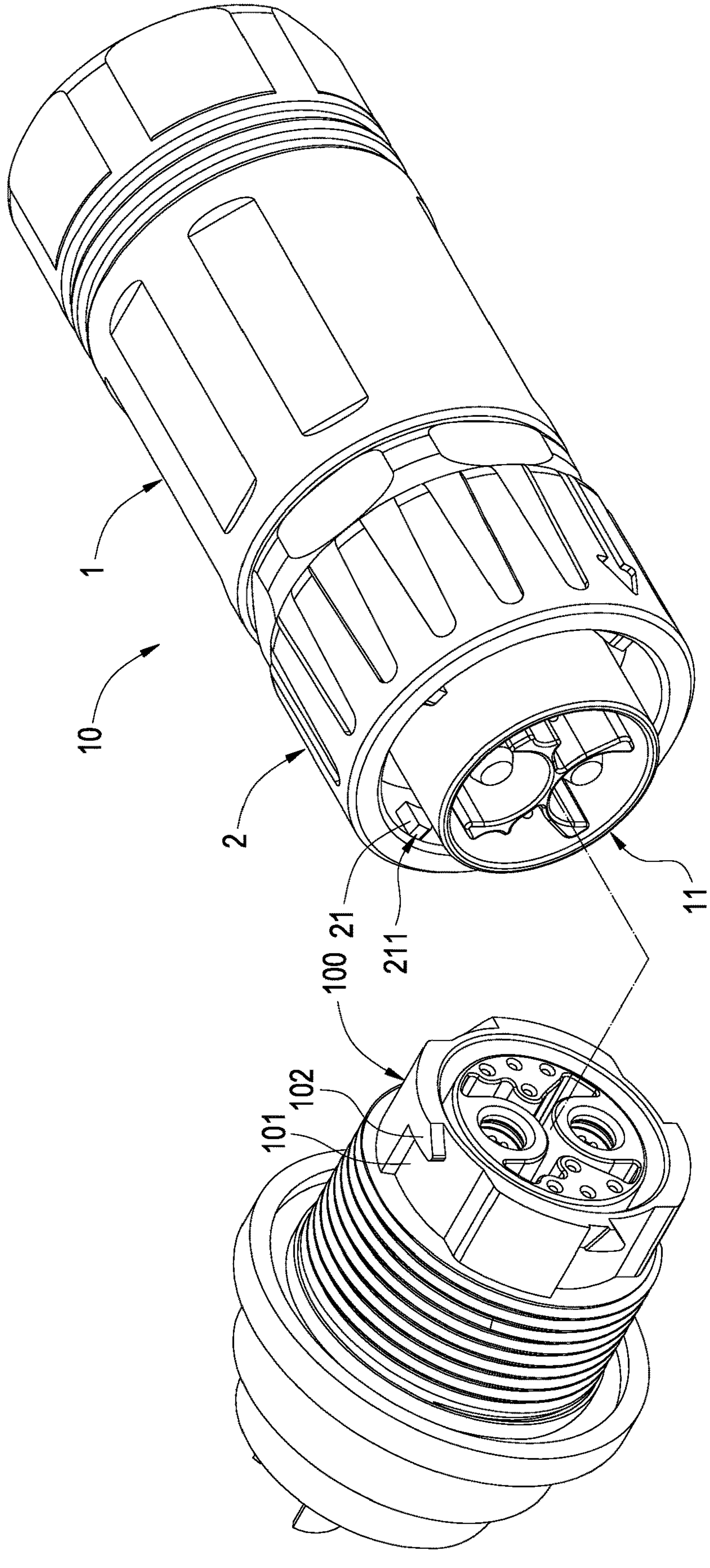
FIG. 5 is a perspective view of using status of the quick-lock connector of the disclosure.
Figure 6:
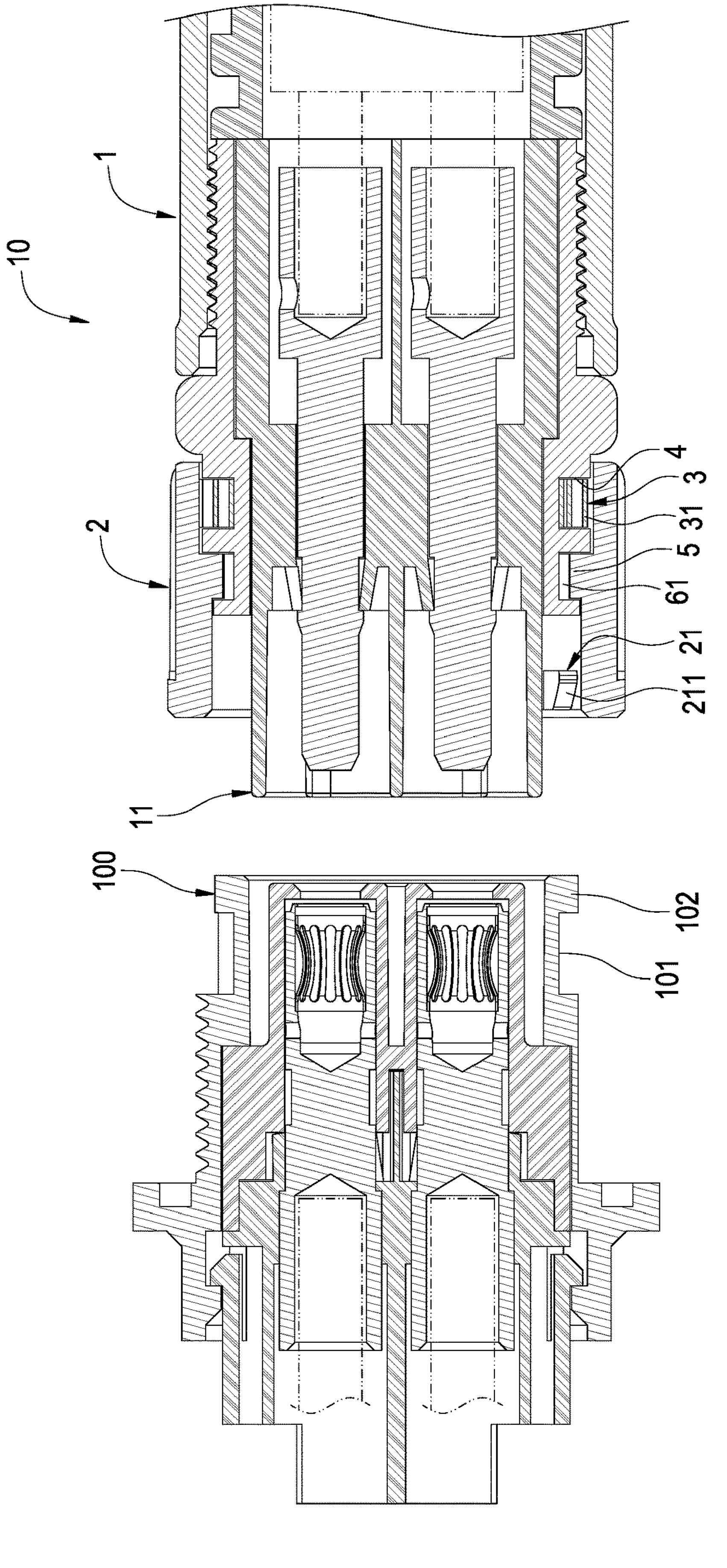
FIG. 6 is a cross-sectional schematic view of the first using status of the quick-lock connector of the disclosure.
Figure 7:
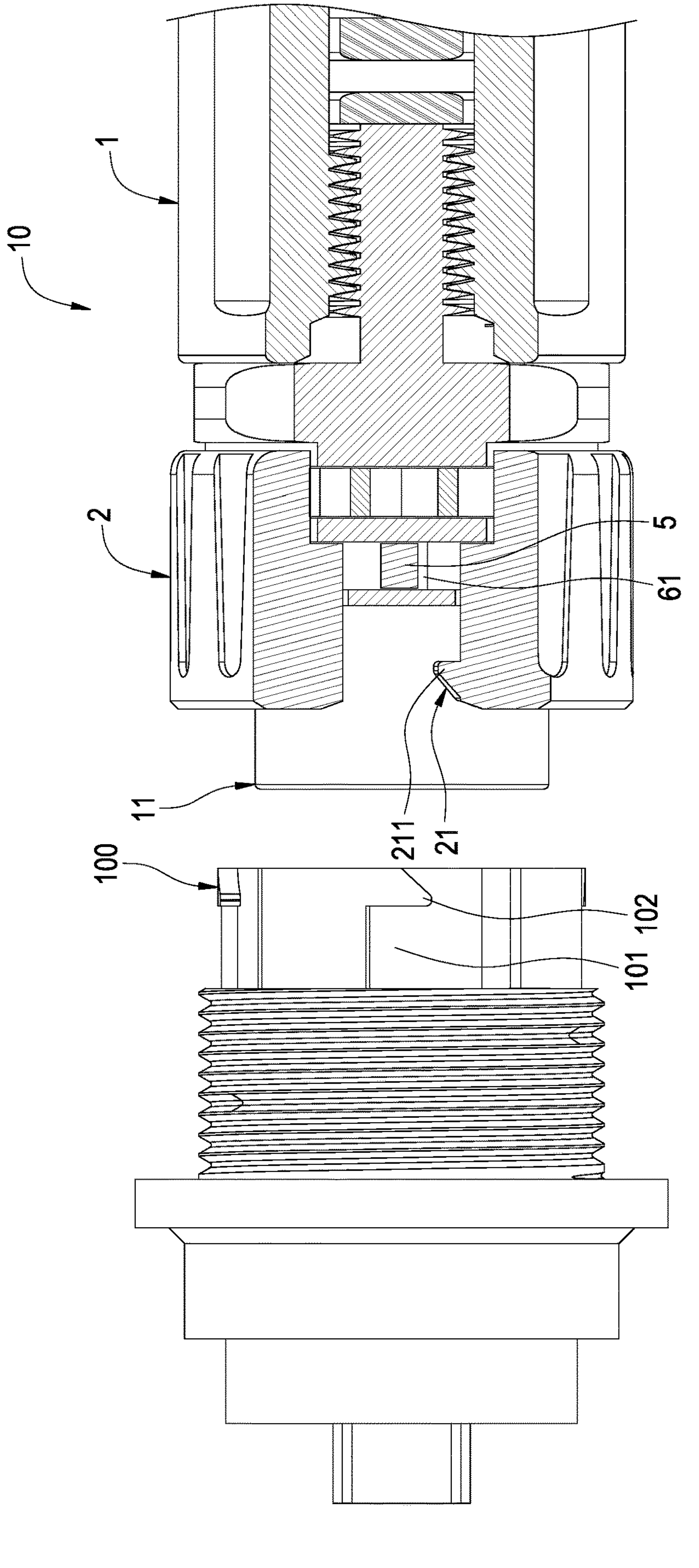
FIG. 7 is a cross-sectional schematic view of the second using status of the quick-lock connector of the disclosure.
Figure 8:
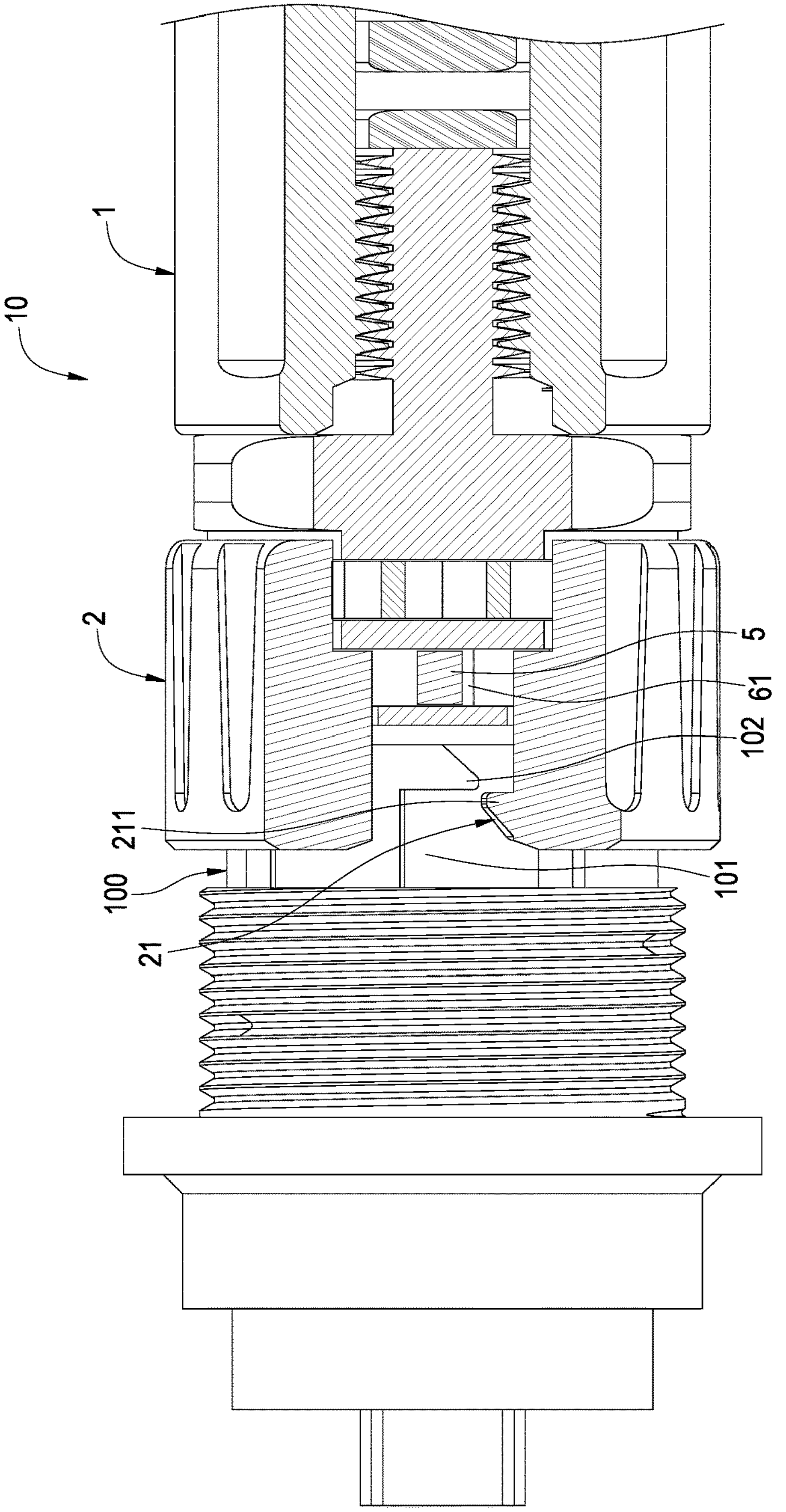
FIG. 8 is a cross-sectional view of the third using status of the quick-lock connector of the disclosure.
Figure 10:
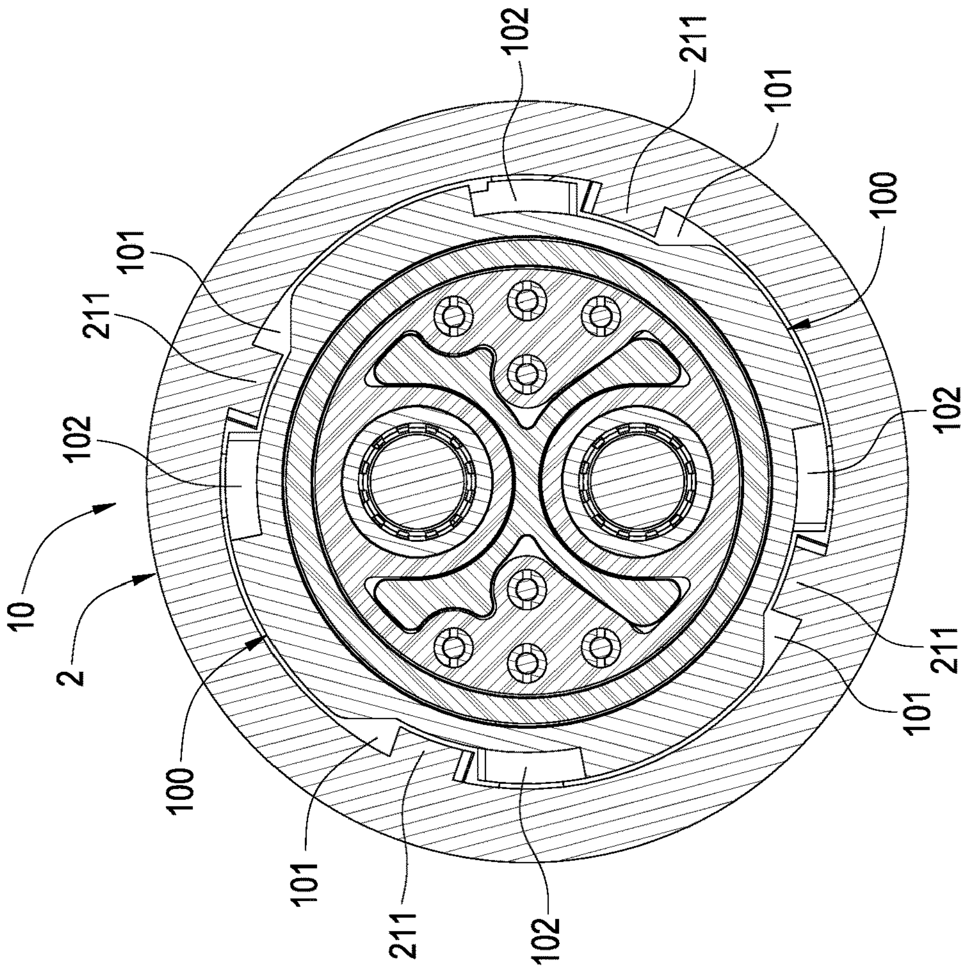
FIG. 10 is a cross-sectional view of the fifth using status of the quick-lock connector of the disclosure.
Figure 9:
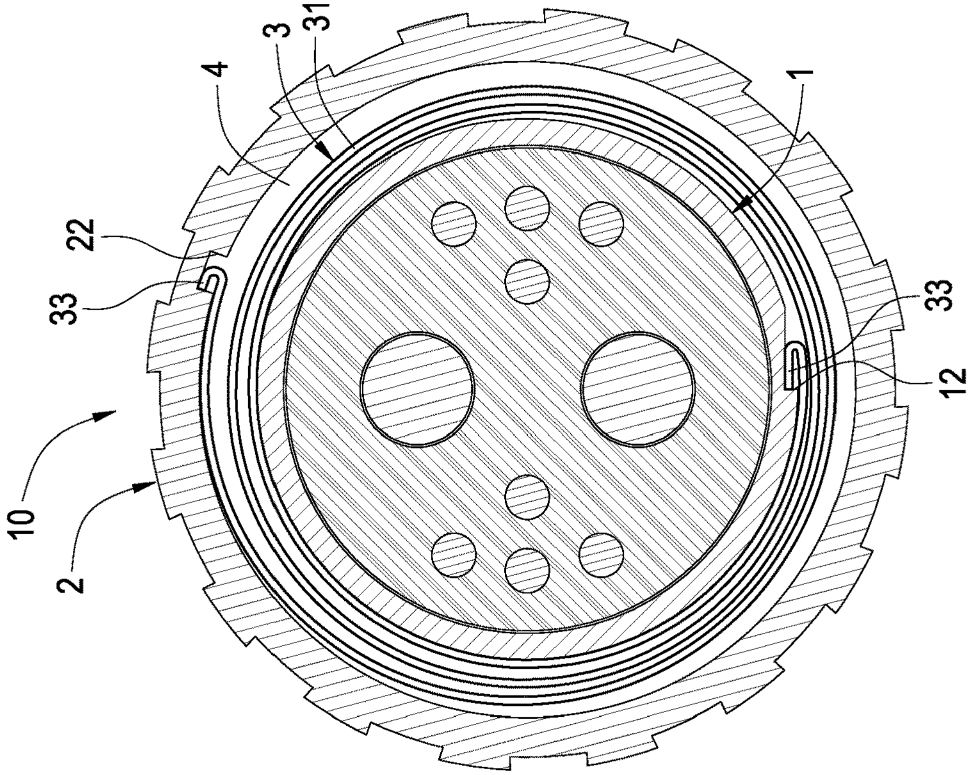
FIG. 9 is a cross-sectional view of the fourth using status of the quick-lock connector of the disclosure.
Figure 11:
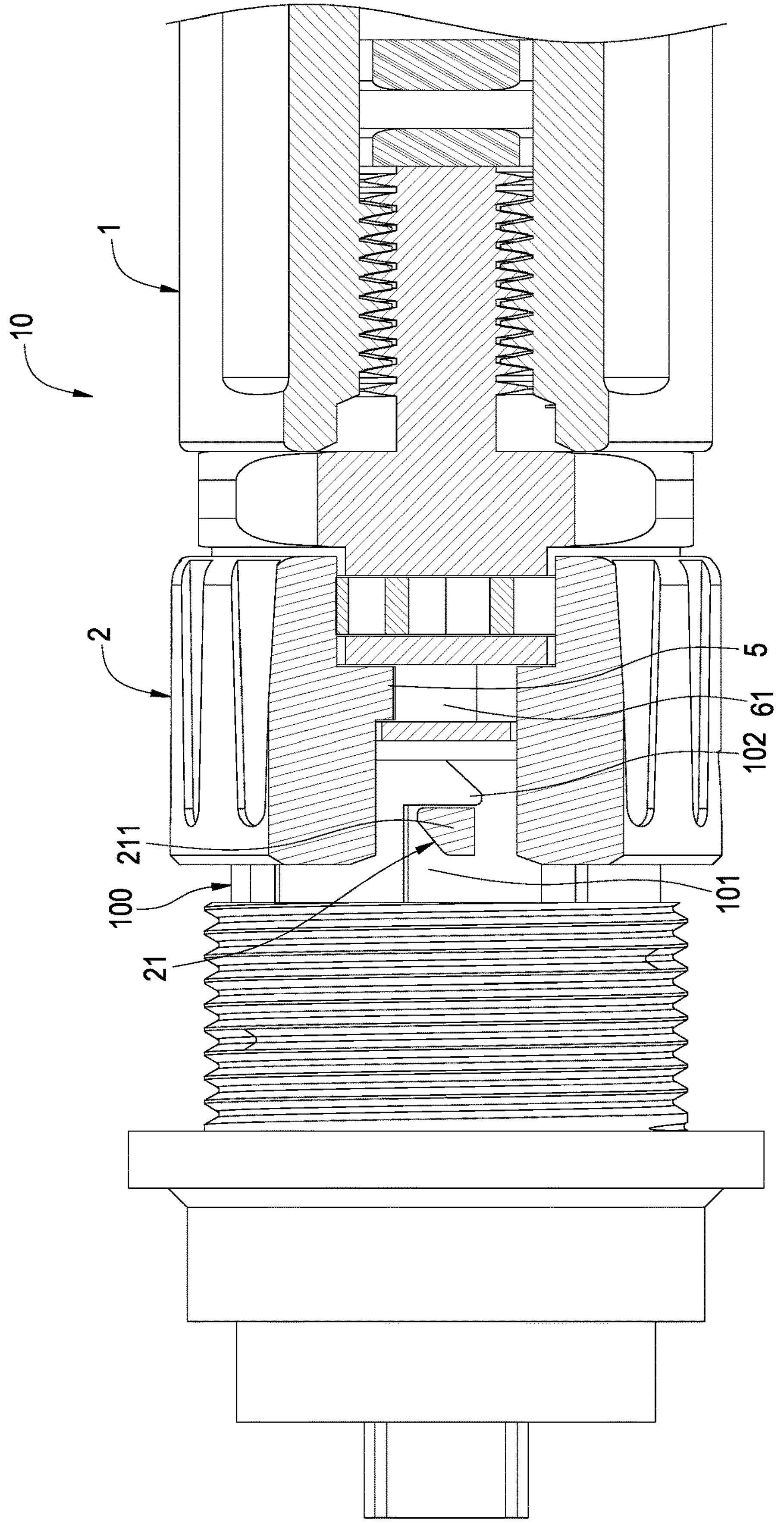
FIG. 11 is a cross-sectional view of the sixth using status of the quick-lock connector of the disclosure.
Figure 12:
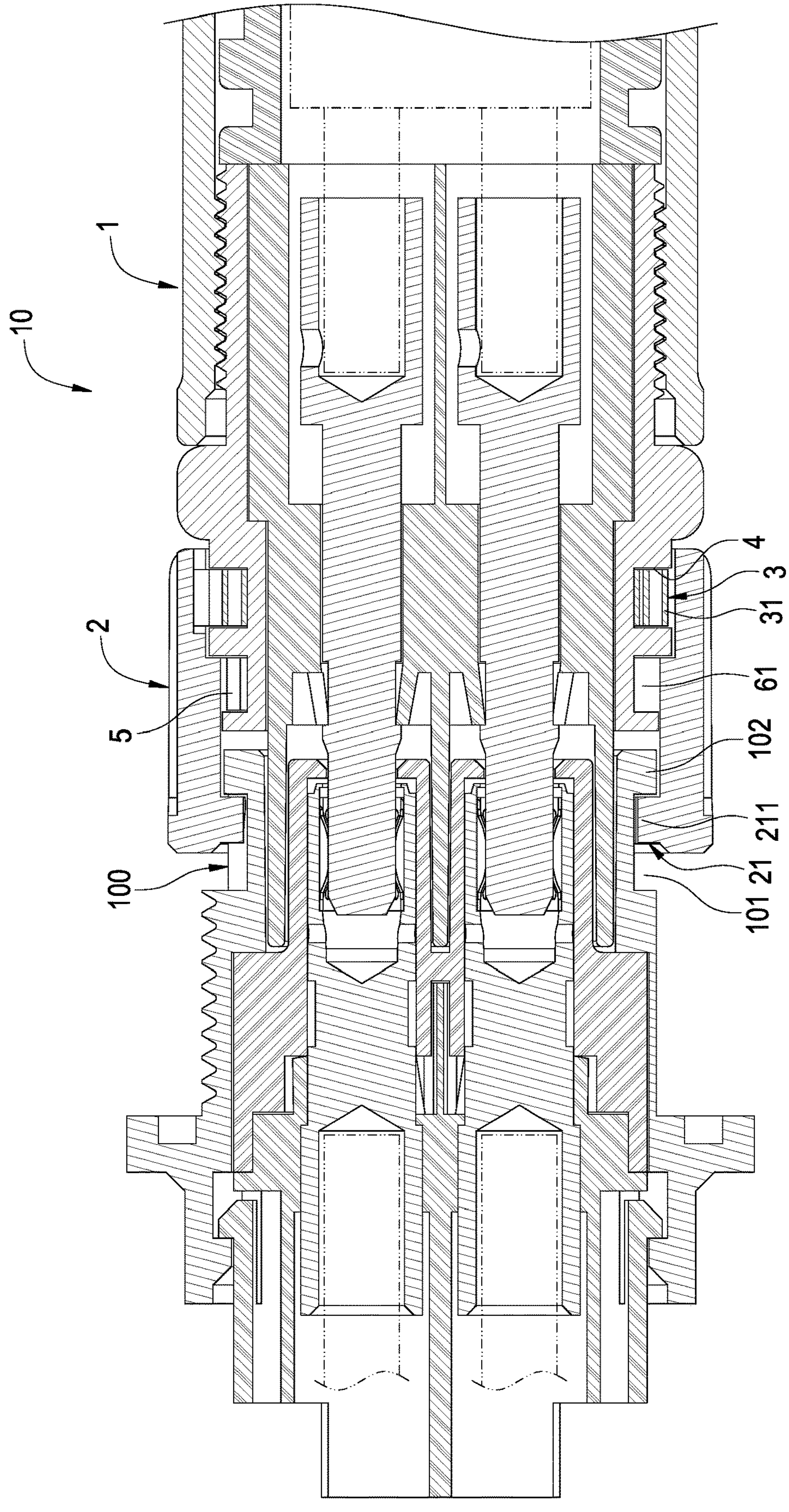
FIG. 12 is a cross-sectional view of the seventh using status of the quick-lock connector of the disclosure.
Figure 14:
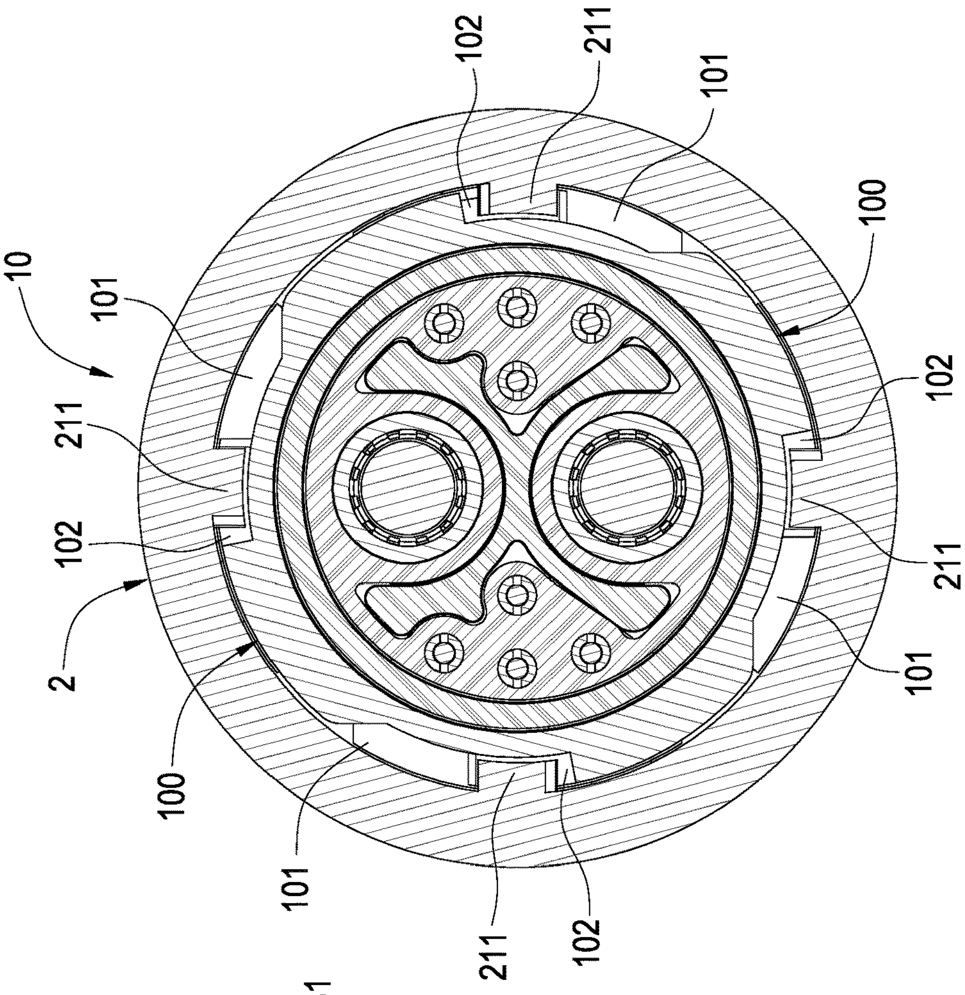
FIG. 14 is a cross-sectional view of the ninth using status of the quick-lock connector of the disclosure.
Figure 13:
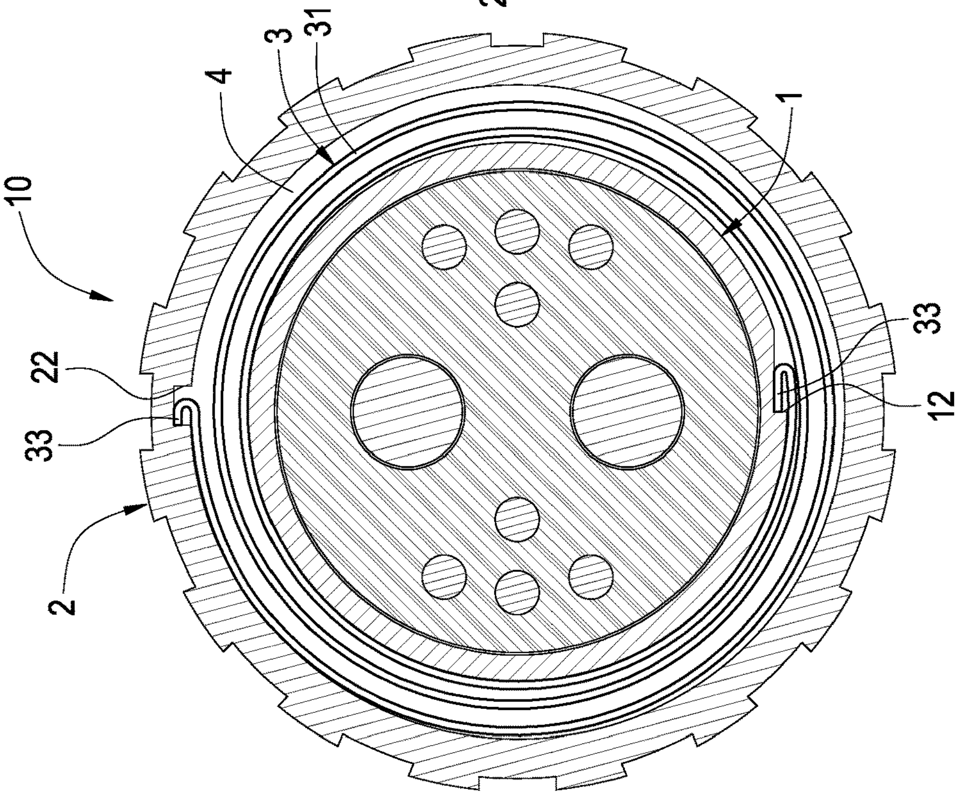
FIG. 13 is a cross-sectional view of the eighth using status of the quick-lock connector of the disclosure.

Please refer to FIGS. 1-14. The disclosure provides a quick-lock connector used for a counterpart connector 100. The quick-locking connector 10 includes a connector body 1, a rotary sleeve 2 and a clockwork spring 3.

As show in FIGS. 1-9 and 11-13, the connector body 1 is of a cylindrical shape. The connector body 1 has a connecting portion 11 at an end thereof. The connector body 1 is a male head of a large-current connector. The connecting portion 11 is a male end. The counterpart connector 100 is, but not limited to, a female head of a large-current connector. The counterpart connector 100 has multiple L-shaped engaging grooves 101 and multiple stopping blocks 102 disposed corresponding to the L-shaped engaging grooves 101 respectively.

As shown in FIGS. 1-14, the rotary sleeve 2 is of a cylindrical shape and rotatably disposed around the connector body 1. The rotary sleeve 2 includes a latching structure 21 which can be engaged with the counterpart connector 100. The latching structure 21 is multiple latches 211 extended from an inner periphery of the rotary sleeve 2. The latches 211 can be moved into the L-shaped engaging grooves 101 respectively and be stopped by the stopping blocks 102 respectively.

In addition, the L-shaped engaging grooves 101 is four, the stopping blocks 102 is four and the latches 211 is four. The four L-shaped engaging grooves 101 and the four stopping blocks 102 are arranged along a circumferential direction of the counterpart connector 100 at regular intervals. That is, the four L-shaped engaging grooves 101 and the four stopping blocks 102 are evenly disposed at the upper, lower, left and right sides of the counterpart connector 100. The four latches 211 are arranged along the inner periphery of the rotary sleeve 2 at regular intervals. That is, the four latches 211 are evenly disposed at the upper, lower, left and right sides of the rotary sleeve 2, so that the connection of the rotary sleeve 2 and the counterpart connector 100 can be firmer and have an even force.

Further, one of the outer periphery of the connector body 1 and the inner periphery of the rotary sleeve 2 is disposed with an annular groove 4. The outer periphery of the connector body 1 is disposed with a first trough 12. The inner periphery of the rotary sleeve 2 is disposed with a second trough 22. In the embodiment, the annular groove 4 is formed on the outer periphery of the connector body 1, but not limited to this, the annular groove 4 may also be formed on the inner periphery of the rotary sleeve 2.

Also, multiple engaging bumps 5 are protruded from one of the outer periphery of the connector body 1 and the inner periphery of the rotary sleeve 2, and another one of the outer periphery of the connector body 1 and the inner periphery of the rotary sleeve 2 has an annular bump 6 extended along a circumferential direction thereof. The annular bump 6 has multiple elongated trenches 61 extended along the circumferential direction and multiple inserting openings 62 at a side of the annular bump 6. The inserting openings 62 are communicated to the elongated trenches 61 respectively. The engaging bumps 5 may be moved into the elongated trenches 61 respectively through the inserting openings 62 respectively so as to be received in the elongated trenches 61 respectively and slidably along a circumferential direction of the annular bump 6.

In addition, one of the engaging bumps 5 has a first slope 51. A ramp block 63 is protruded from an inner bottom surface at one end of the elongated trenches 61 which is adjacent to the inserting opening 62. The ramp block 63 has a height thereof decreasing toward the inserting opening 62 so as to defined a second slope 631. When the engaging bump 5 is in the inserting opening 62, the first slope 51 and the second slope 631 can abut against each other to guide the engaging bump 5 to slide through the ramp block 63 first and then enter the elongated trench 61. When the engaging bump 5 is located in the elongated trench 61, the ramp block 63 stops between the elongated trench 61 and the inserting opening 62, so the engaging bump 5 and the ramp block 63 can stop each other to use the ramp block 63 to limit the engaging bump 5 to be located in the elongated trench 61.

In the embodiment, the multiple engaging bumps 5 are protruded from the inner periphery of the rotary sleeve 2, and the annular bump 6 is protruded from the outer periphery of the connector body 1, but not limited to this, the multiple engaging bumps 5 may also be protruded from the outer periphery of the connector body 1, and the annular bump 6 may also be protruded from the inner periphery of the rotary sleeve 2.

Also, in the embodiment, the engaging bumps 5 are four in number, and the elongated trenches 61 are four in number. The four engaging bumps 5 and the four elongated trenches 61 are arranged along the outer periphery of the connector body 1 and the inner periphery of the rotary sleeve 2 at regular intervals. That is, the four engaging bumps 5 and the four elongated trenches 61 are evenly disposed at the upper, lower, left and right sides of the connector body 1 and the rotary sleeve 2, so that the connection of the rotary sleeve 2 and the connector body 1 can be firmer and have an even force.

As shown in FIGS. 1-2, 6, 9, 12 and 14, the clockwork spring 3 is an elastic spiral strip 31 passing between the connector body 1 and the rotary sleeve 2 along the circumferential direction of the connector body 1. An end of the elastic spiral strip 31 is fixed to the connector body 1 and the other end is fixed to the rotary sleeve 2 so as to make the clockwork spring 3 pass and support between the connector body 1 and the rotary sleeve 2.

In detail, the elastic spiral strip 31 is embedded in the annular groove 4 and one end thereof is bent with a first folding end 32 embedded into the first trough 12 and the other end is bent with a second folding end 33 embedded into the second trough 22.

The multiple engaging bumps 5 and the annular bump 6 are arranged between the connecting portion 11 and the clockwork spring 3. The clockwork spring 3 drives the rotary sleeve 2 to move to a position of each latch 211 which is stopped by each stopping block 102 to return.

As shown in FIGS. 1-14, the using status of the quick-lock connector 10 uses the clockwork spring 3 passing and supporting between the connector body 1 and the rotary sleeve 2. Because the clockwork spring 3 is an elastic spiral strip 31 and the annular outline of the elastic spiral strip 31 is adapted to being installed in an annular space, so the clockwork spring 3 may directly pass between connector body 1 and the rotary sleeve 2 without both being bent and deformed and adding a guiding mechanism. Thus, when assembling the quick-lock connector 10, the clockwork spring 3 will not separate from the rotary sleeve 2 due to elastic return even if an improper force is exerted on the clockwork spring 3, so as to make the quick-lock connector 10 have advantages of easy assembling and labor saving.

While this disclosure has been described by means of specific embodiments, numerous modifications and variations could be made thereto by those skilled in the art without departing from the scope and spirit of this disclosure set forth in the claims.

What is claimed is:

1. A quick-lock connector used for a counterpart connector (100), the quick-lock connector (10) comprising:

a connector body (1);

a rotary sleeve (2), rotatably disposed around the connector body (1), and the rotary sleeve (2) comprising a latching structure (21) capable of latching the counterpart connector (100); and a clockwork spring (3), nested between the connector body (1) and the rotary sleeve (2) for elastically supporting, which is an elastic spiral strip (31) coiled from inner a first end fixed to the connector body (1) to outer a second end fixed to the rotary sleeve (2) on a same plane;

wherein multiple engaging bumps (5) extend from one of an outer periphery of the connector body (1) and an inner periphery of the rotary sleeve (2), and an annular bump (6) circumferentially extends on another one of the outer periphery of the connector body (1) and the inner periphery of the rotary sleeve (2), the annular bump (6) comprises multiple elongated trenches (61) extending circumferentially and multiple inserting openings (62) disposed at a side thereof and respectively communicating with the elongated trenches (61), the engaging bumps (5) are allowed to move into the elongated trenches (61) through the inserting openings (62) respectively so as to be received in the elongated trenches (61) respectively and slidable along a circumferential direction of the annular bump (6);

wherein one engaging bump (5) comprises a first slope (51), a ramp block (63) protrudes from an inner bottom surface at one end of one elongated trench (61) adjacent to one inserting opening (62), the ramp block (63) comprises a height thereof decreasing toward the one inserting opening (62) so as to define a second slope (631);

wherein when the one engaging bump (5) is in the one inserting opening (62), the first slope (51) and the second slope (631) abut against with each other to guide the one engaging bump (5) to slide through the ramp block (63) first and then enter the one elongated trench (61);

wherein when the one engaging bump (5) is located in the one elongated trench (61), the ramp block (63) stops between the one elongated trench (61) and the one inserting opening (62), so the one engaging bump (5) and the ramp block (63) stop each other to use the ramp block (63) to limit the one engaging bump (5) to be located in the one elongated trench (61).

2. The quick-lock connector of claim 1, wherein an annular groove (4) is defined on one of the outer periphery of the connector body (1) and the inner periphery of the rotary sleeve (2), the outer periphery of the connector body (1) is disposed with a first trough (12), the inner periphery of the rotary sleeve (2) is disposed with a second trough (22), and the elastic spiral strip (31) is embedded in the annular groove (4) to have the first end bent to form a first folding end (32) embedded into the first trough (12) and-the second end bent to form a second folding end (33) embedded into the second trough (22).

3. The quick-lock connector of claim 1, wherein the engaging bumps (5) are four in number and the elongated trenches (61) are four in number, the four engaging bumps (5) and the four elongated trenches (61) are respectively arranged along the outer periphery of the connector body (1) and the inner periphery of the rotary sleeve (2) at intervals.

4. The quick-lock connector of claim 1, wherein the connector body (1) comprises a connecting portion (11) at an end thereof, and the multiple engaging bumps (5) and the annular bump (6) are arranged between the connecting portion (11) and the clockwork spring (3).

5. The quick-lock connector of claim 1, wherein the counterpart connector (100) comprises multiple L-shaped engaging grooves (101) and multiple stopping blocks (102) disposed corresponding to the L-shaped engaging grooves (101) respectively, the latching structure (21) comprises multiple latches (211) extending from an inner periphery of the rotary sleeve (2), the latches (211) are allowed to move into the L-shaped engaging grooves (101) respectively and stopped by the stopping blocks (102) respectively.

6. The quick-lock connector of claim 5, wherein the clockwork spring (3) returns the rotary sleeve (2) to a position to stop the latches (211) by the stopping blocks (102) respectively.

7. The quick-lock connector of claim 5, wherein the L-shaped engaging grooves (101) are four in number, the stopping blocks (102) are four in number and the latches (211) are four in number, the four L-shaped engaging grooves (101) and the four stopping blocks (102) are arranged along a circumferential direction of the counterpart connector (100) at intervals, and the four latches (211) are arranged along an inner periphery of the rotary sleeve (2) at intervals.

* * * * *